3,126,324
CATALASE COMPOSITIONS
Milton A. Mitz, Chicago, Ill., and Sam Satomi Yanari, St. Paul, Minn., assignors, by mesne assignments, to Armour-Pharmaceutical, a corporation of Delaware
No Drawing. Filed Dec. 23, 1957, Ser. No. 704,238
6 Claims. (Cl. 195—63)

This invention relates to catalase compositions, and more particularly to an insoluble catalase complex useful for generating oxygen gas by chemical reaction and to a process for generating oxygen gas.

This patent application is in part a continuation of our patent application Serial No. 492,311, filed March 4, 1955, now abandoned.

An object of this invention is the provision of a catalase composition which, while being in an insoluble form, demonstrates catalase actvity by its ability to hydrolyze peroxides. Another object is the provision of an insoluble catalase complex useful for generating oxygen gas under pressure. A further object is to provide a chemical process for the generation of oxygen gas under pressure. Another object is the provision of a chemical process for simultaneously producing sterile water and generating sterile oxygen gas under pressure. Still another object is to provide an oxygen-generating system in which the production of oxygen and recharging of the system can be obtained in a continuous cycle. Other objects and advantages of this invention will become apparent as the specification proceeds.

In one aspect of this invention oxygen gas can be generated by a chemical reaction which involves contacting a peroxide substance with a water-insoluble salt having a catalase component and a cellulose component containing bonded anion exchange groups. For purposes of this invention, it is meant by "water-insoluble salt" that there is formed by the reaction of the acidic groups of catalase and the basic groups of the cellulose anion exchanger a complex which is substantially insoluble in water. This catalase complex maintains its peroxide-hydrolysing activity while the catalase component thereof is immobilized, i.e. while the catalase is bound to the cellulose component of such complex. Also, we found that the catalase activity was stabilized when provided as the water-insoluble salt of the cellulose anion exchanger. In the experimentation leading to this invention, it had been expected that hydrogen peroxide would competitively displace catalse from the cellulose anion exchanger, whereby the enzyme would be eluted in soluble form. Instead, it was found that the hydrogen peroxide was apparently hydrolyzed by the catalase so rapidly that displacement of the enzyme from the cellulose anion exchanger did not occur. However, the catalase can be eluted from the cellulose anion exchanger by conventional eluants such as solutions of sodium chloride and sodium phosphate. Consequently, in this oxygen-generating process, the catalase-cellulose complex reaction system may be recharged without disrupting the operation by eluting inactivated catalase from the cellulose anion exchanger and regenerating the reaction system by adsorbing new catalase thereon.

In another aspect of this invention sterile oxygen gas and sterile water can be produced simultaneously by a chemical method which involves contacting a peroxide substance with a water-insoluble salt having a catalase component and a cellulose component containing chemically bonded anion exchange groups. In this process the enzymatic hydrolysis of peroxide by the catalase complex results in the evolution of sterile oxygen under pressure, while the residual liquid obtained from this oxygen-generating system consists of sterile water.

This water-insoluble catalase salt, including a catalase component and a cellulose component, may be obtained by reacting a catalase substance with a cellulose anion exchanger, according to conventional ion exchange procedures.

The catalase component of this complex may be a catalase substance derived from any catalase-bearing animal tissue. Preferably, this catalase component is a fairly well purified concentrate of mammalian liver such as is described in the co-pending application Serial No. 322,160 of K. C. Robbins, filed November 22, 1952, now U.S. Patent No. 2,834,713, wherein one method of preparing the catalase substance involves extracting frozen comminuted beef liver tissue with two volumes of 70% ethanol at a temperature of $-5°$ C. for a period of about 2 to 3 hours, separating and discarding the resulting ethanol extract, extracting the tissue residue thereupon obtained with 2½ volumes of water at a temperature of about 0° C. for a period of about 16 hours in which extract the pH is about 6.5, separating the resulting catalase extract, adjusting the pH thereof to pH 5.3 with acetic acid, separating and discarding the precipitate thereupon formed, precipitating the catalase with ethanol at a concentration of 40% by volume at a pH of 5.8 and a temperature of $-5°$ C., separating the resulting catalase precipitate, suspending this precipitate in 0.075 M sodium acetate buffer solution at a pH of 6.2, crystallizing the catalase by adjusting the pH of such solution to 5.7 and holding the suspension at a temperature of 1° C. for a period of from 24 to 48 hours, separating the catalase crystals from the mother liquor, dialyzing the catalase crystals against running tap water, and clarifying the dialyzed suspension to obtain a solution of crystallized catalase. Although this method results in a catalase concentrate especially suitable for this oxygen-generating process, we have found that any catalase concentrate, regardles of its source or preparative history, may be employed in this oxygen-generating process.

The cellulose component of this catalase salt may be derived from any cellulose containing anion exchange groups bonded to the cellulose molecule. By anion exchange groups bonded to the cellulose molecule we mean terminal groups attached to the polysaccharide molecule capable of entering into an exchange reaction with anionic groups of other compounds. Preferably, the cellulose material included in this cellulose component is an alpha cellulose, such as cotton, wood pulp, paper or cotton cloth. The anion exchange groups attached to the cellulose molecule in this cellulose component may be any radicals capable of entering into an exchange reaction with anionic substances. We mention, for example, such suitable cellulose anion exchangers as dimethylaminoethyl cellulose and diethylaminoethyl cellulose. These exemplary anionic cellulose exchangers may be obtained by reacting sodium cellulose with a 2-chlorodimethylethyl amine, e.g. 2-(N,N-dimethyl)-amino-ethyl chloride-hydrochloride, or a 2-chlorotriethyl amine, e.g. 2-(N,N-diethyl)-aminoethyl chloride-hydrochloride, respectively.

The peroxide substrate employed in this oxygen-generating process may be any peroxide substance which, upon hydrolysis by catalase, results in an oxygen gas product. However, when sterile water is to be produced simultaneously with the generation of oxygen, the peroxide substrate should be hydrogen peroxide for when such a suitable oxygen-generating substrate such as ethyl peroxide is employed therein the split-products, other than oxygen gas, may be ethanol.

The concentration of the peroxide substance in contact with the catalase complex, and the rate of contact between such peroxide substance and the catalase complex, should be such that the catalase can generate oxygen without its activity being impaired by too high a concentration of the peroxide reactant. For example, we have found that the concentration of hydrogen peroxide in contact with the catalase complex and the rate of contact between such hydrogen peroxide and the catalase complex may be increased when a greater concentration of the catalase complex is employed in the system or with a larger surface area of the catalase complex being exposed to the catalase complex therein. The concentration of hydrogen peroxide in contract with the catalase complex may be about 3% by volume. When a commercial hydrogen peroxide produce having a concentration greater than 3% thereof, e.g. 50% hydroxide peroxide solution is utilized in this process, it may be diluted with water prior to contact with the catalase complex. An especially practical process results when a commercial hydrogen peroxide product is diluted with the liquid supernatant derived from the oxygen-generating system to produce a concentration of hydrogen peroxide suitable for contact with the catalase complex. This dilution step may be obtained continuously by by-passing the liquid supernatant and proportioning it into the hydrogen peroxide-charging liquid.

In practicing the oxygen-generating process of this invention, the contact between the peroxide substance and the catalase complex may be obtained in either a batch or column operation. For example, this column operation may involve charging the catalase complex into a vertically arranged cylinder to form an adsorption bed similar to that employed in ion exchange or chromatographic processes. A solution of the peroxide substance may then be passed through this adsorption bed at a constant rate of flow. The sterile oxygen evolved in the resulting reaction may be taken out of the system continuously through an aperture at the top of the cylinder and stored in a pressure chamber or utilized directly in a system requiring pressurized oxygen. The sterile water, produced simultaneously with the generating of oxygen when hydrogen peroxide is employed as the catalase substrate, may be separated from the reaction system by gravity at the bottom of the cylinder and delivered to a storage chamber or directly to the site of its employment. When the catalase activity in the column has been dissipated it can be eluted from the anionic cellulose exchanger by arresting the flow of peroxide solution through the reaction system and passing an aqueous solution of sodium chloride or sodium phosphate through the column. This salt solution elutes the catalase from the cellulose exchanger and eliminates it from the system in soluble form. Then, the column can be recharged by passing an aqueous solution of catalase therethrough, whereby the catalase is absorbed onto the cellulose exchanger. After recharging the column, the flow of peroxide solution can be resumed to continue the generation of oxygen gas and production of sterile water in the system.

This oxygen-generating system does not require elaborate equipment for operation, and consequently the catalase complex can be utilized in the production of oxygen gas in places remote from manufacturing and plant operations.

This invention can be more fully illustrated by the following examples:

*Example I*

A cellulose anion exchanger was prepared by the following method: 2-chlorotriethyl hydrochloride, in the amount of 10 gms. was dissolved in 100 ml. of distilled water contained in a one liter beaker. The resulting solution was mixed with 20 gms. of absorbent cotton. This mixture was heated in an oven at a temperature of 100° C. for a period of 18 hours. Thereafter, the dried cellulose amine hydrochloride material was covered with hot, saturated sodium hydroxide solution, and after 15 minutes the excess alkali was separated by dilution and centrifugation. The cellulose precipitate thereby obtained was washed with distilled water until it was the same pH as the distilled water.

The exchange properties of this cellulose anion exchanger were analyzed by mixing 10 ml. of 0.5M sodium chloride with 100 mg. of the exchanger. The pH change thereby produced was from pH 7 to pH 9.6. The pK of this cellulose derivative is described in literature as being 7.7. Also, 1 gm. of the cellulose anion exchanger adsorbed 50 ml. of a 0.01% solution, or 5 mg. of sodium salt, of orange G.

*Example II*

A few drops of a solution containing crystallized catalase was mixed with 1 gm. of the cellulose anion exchanger obtained by the method of Example I. The cellulose material has been charged into a glass cylinder, and consequently the dispersion of the catalase through the cellulose anion exchanger could be observed visually due to the natural green color of catalase. Washing the adsorbed catalase failed to mobilize the green color. The catalase was displaced from the cellulose anion exchanger with a dilute aqueous solution of sodium chloride. Also, a dilute solution of sodium phosphate was able to competitively elute the catalase from the cellulose anion exchanger.

While in the foregoing specification various embodiments of this invention have been set forth and specific details thereof elaborated for the purpose of illustration, it will be apparent to those skilled in the art that this invention is susceptible to other embodiments and that many of these details can be varied widely without departing from the basic concept and spirit of the invention.

We claim:

1. An active catalase composition, comprising a water-insoluble salt having a catalase component and a cellulose component containing bonded anion exchange groups, said water-insoluble salt being characterized analytically by hydrolyzing hydrogen peroxide to evolve oxygen gas.

2. The composition of claim 1 in which said cellulose component is derived from alpha cellulose.

3. The composition of claim 1 in which said cellulose component is selected from the group consisting of dimethylaminoethyl cellulose and diethylaminoethyl cellulose components.

4. The composition of claim 1 in which said cellulose component is a condensation product of an alpha cellulose with a compound of the group consisting of 2-(N,N-dimethyl)-amino-ethyl-chloride and 2-(N,N-diethyl)-amino-ethyl chloride.

5. The composition of claim 4 in which said alpha cellulose is sodium cellulose.

6. The composition of claim 1 in which said cellulose component is a condensation product of sodium cellulose with a compound of the group consisting of 2-chlorotriethyl amine and 2-chlorodimethylethyl amine.

References Cited in the file of this patent

UNITED STATES PATENTS

| | | |
|---|---|---|
| 1,701,825 | Seil | Feb. 12, 1929 |
| 2,490,587 | Fontana et al. | Dec. 6, 1949 |
| 2,635,069 | Baker | Apr. 14, 1953 |
| 2,717,852 | Stone | Sept. 13, 1955 |
| 2,834,713 | Robbins | May 13, 1958 |

OTHER REFERENCES

"Advances in Enzymology," vol. 14 (pp. 325, 332, 337, 339 and 348 (1953), Interscience Publishers, Inc., New York). (Copy in Sci. Lib.)

Tauber article in Journal of Biological Chemistry, vol. 113, pages 753 to 756, 1936.

Peterson et al. in Journal of American Chemical Society, vol. 78, pages 751 to 755.

Ion Exchangers in Organic and Biochemistry, 1957, chapter 16, pp. 325–338 particularly relied upon, Interscience Publishers, Inc., New York.